US012583315B2

(12) United States Patent
Matsunobu

(10) Patent No.: US 12,583,315 B2
(45) Date of Patent: Mar. 24, 2026

(54) DISPLAY CONTROL DEVICE, DISPLAY DEVICE, VEHICLE, DISPLAY CONTROL METHOD, AND RECORDING MEDIUM RECORDED WITH DISPLAY CONTROL PROGRAM

(71) Applicant: TOYOTA JIDOSHA KABUSHIKI KAISHA, Toyota (JP)

(72) Inventor: Go Matsunobu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 453 days.

(21) Appl. No.: 17/700,578

(22) Filed: Mar. 22, 2022

(65) Prior Publication Data

US 2022/0355665 A1      Nov. 10, 2022

(30) Foreign Application Priority Data

May 10, 2021    (JP) ................................. 2021-079539

(51) Int. Cl.
B60K 35/10          (2024.01)
B60K 35/233         (2024.01)
(Continued)

(52) U.S. Cl.
CPC ............ B60K 35/10 (2024.01); B60K 35/233 (2024.01); B60K 35/235 (2024.01); B60K 35/28 (2024.01);
(Continued)

(58) Field of Classification Search
CPC ........ B60K 35/00; B60K 35/10; B60K 35/23; B60K 35/28; B60K 35/658; B60K 35/81;
(Continued)

(56) References Cited

U.S. PATENT DOCUMENTS

| | | | |
|---|---|---|---|
| 5,115,398 A | 5/1992 | De Jong | |
| 9,103,942 B2 * | 8/2015 | Moldoveanu | ........ G01V 1/3826 |
| 9,690,098 B1 * | 6/2017 | Kuo | .................. G02B 27/0149 |
| 2012/0026425 A1 * | 2/2012 | Kumaki | .............. G09G 3/3413 |
| | | | 349/62 |

(Continued)

FOREIGN PATENT DOCUMENTS

| | | |
|---|---|---|
| CN | 110632756 A | 12/2019 |
| DE | 10 2013 208 971 A1 | 11/2014 |

(Continued)

OTHER PUBLICATIONS

English Translation of the BIBELGAE reference (DE 10 2013 208 971 ) (Year: 2024).*
English translation of Chuan JP2019219547A (Year: 2024).*

*Primary Examiner* — Scott A Browne
*Assistant Examiner* — Shahira Baajour
(74) *Attorney, Agent, or Firm* — Oliff PLC

(57) ABSTRACT

A display control device that includes: a processor; and a memory that is coupled with the processor and is configured to store a correspondence relationship between an angle of a mirror configured to reflect light for display on a display and depth information indicating a virtual display position of an image for display on the display so as to correspond to an external scene, the processor being configured to: receive input from a user, and change the mirror angle in response to the received input, adjust a display position of an image to be displayed on the display based on the depth information associated with the mirror angle after it is changed, and display the image on the display.

7 Claims, 13 Drawing Sheets

(51) Int. Cl.
  *B60K 35/235*        (2024.01)
  *B60K 35/28*         (2024.01)
  *B60K 35/65*         (2024.01)
  *B60K 35/81*         (2024.01)

(52) U.S. Cl.
  CPC ............ *B60K 35/658* (2024.01); *B60K 35/81*
        (2024.01); *B60K 2360/177* (2024.01); *B60K*
                                   *2360/23* (2024.01)

(58) Field of Classification Search
  CPC ........ B60K 2360/149; B60K 2360/177; B60K
            2360/23; B60K 2360/166; B60K
          2360/176; B60K 2360/31; G09G 2380/10;
            G02B 27/0093; G02B 27/0101; G02B
          27/0179; G06F 3/147; B60R 1/00; B60R
                            2300/8086; G01C 21/365
  See application file for complete search history.

(56)                References Cited

U.S. PATENT DOCUMENTS

| 2015/0092118 A1* | 4/2015 | Hada | G02B 26/105 |
| | | | 349/11 |
| 2016/0105649 A1* | 4/2016 | Pettegrew | H04N 23/23 |
| | | | 348/37 |
| 2017/0169612 A1 | 6/2017 | Cashen et al. | |
| 2017/0309257 A1 | 10/2017 | Akita et al. | |
| 2019/0391400 A1 | 12/2019 | Funabiki et al. | |

FOREIGN PATENT DOCUMENTS

| JP | H-03148800 A | 6/1991 | |
| JP | 2019219547 A * | 12/2019 | B60K 35/00 |
| JP | 2021-15166 A | 2/2021 | |
| WO | 2016/067574 A1 | 5/2016 | |

* cited by examiner

FIG.4

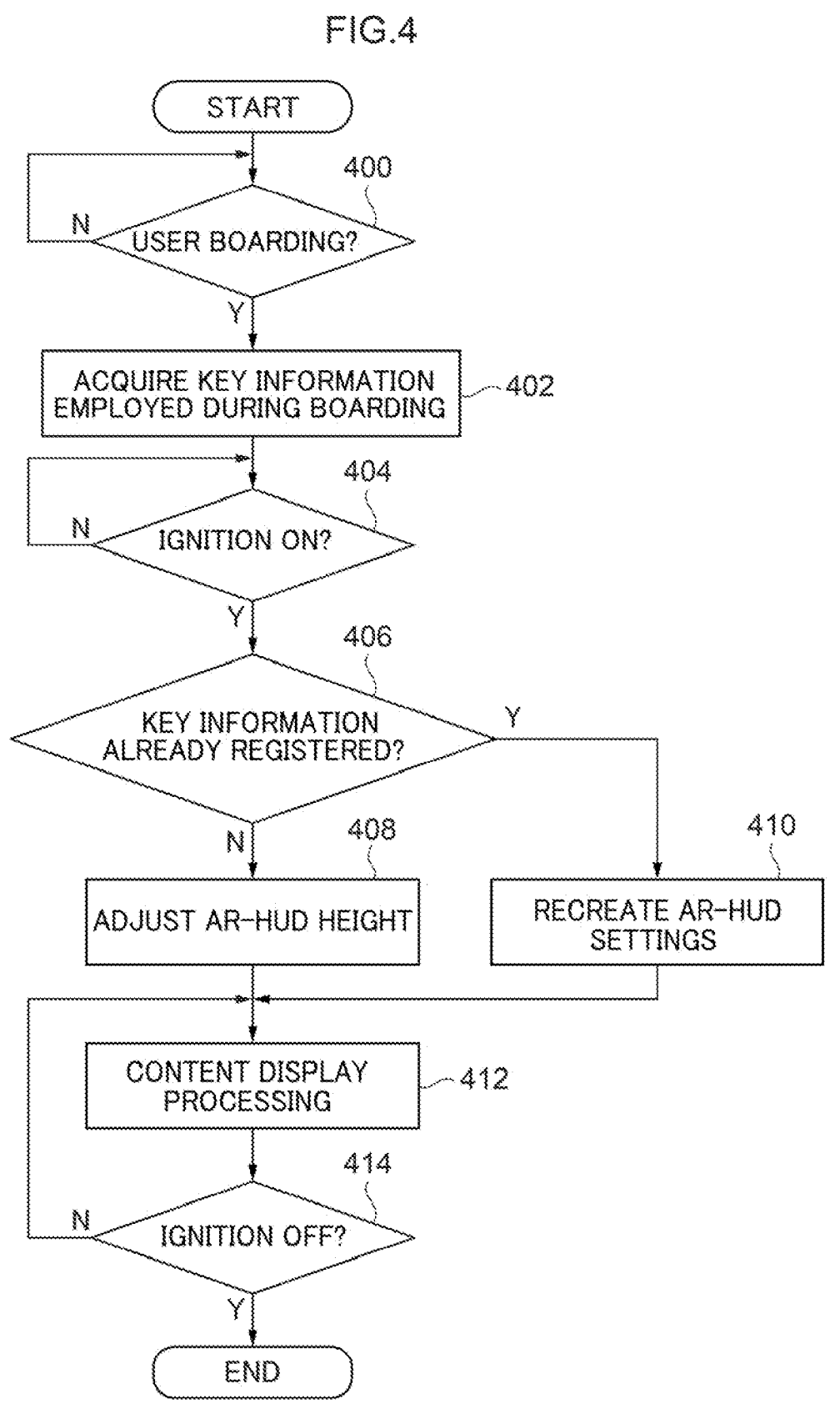

START

400

N — USER BOARDING?

Y

ACQUIRE KEY INFORMATION
EMPLOYED DURING BOARDING — 402

404

N — IGNITION ON?

Y

406

KEY INFORMATION
ALREADY REGISTERED? — Y

N — 408

ADJUST AR-HUD HEIGHT

410

RECREATE AR-HUD
SETTINGS

CONTENT DISPLAY
PROCESSING — 412

414

N — IGNITION OFF?

Y

END

DISPLAY FRAME
(LOWER EDGE) DISAPPEARS

FIG.5C

UP-DOWN
ADJUSTMENT
OF DISPLAY
FRAME

IDEAL OVERLAY
(NO MISALIGNMENT)

DISPLAY FRAME
(UPPER EDGE)
DISAPPEARS

DISPLAY FRAME
MOVES
DOWNWARD

78

ROAD TO
TURN ONTO

80

70

72

HIGH SEATED
HEIGHT

| GROUP | STEP COUNT | MIRROR ANGLE (θ) | EP HEIGHT (m) | ANGLE OF DEPRESSION (deg) | DEPTH INFORMATION (m) |
|---|---|---|---|---|---|
| G1 | N1 | θ1 | EP1 | φ1 | L1max–L1min |
| | | | ··· (OMITTED) | | |
| G1 | N8 | θ8 | EP8 | φ8 | |
| G2 | N9 | θ9 | EP9 | φ9 | L2max–L2min |
| | | | ··· (OMITTED) | | |
| G2 | N16 | θ16 | EP16 | φ16 | |
| G3 | N17 | θ17 | EP17 | φ17 | L3max–L3min |
| | | | ··· (OMITTED) | | |
| G3 | N24 | θ24 | EP24 | φ24 | |

DISPLAY CONTROL DEVICE, DISPLAY DEVICE, VEHICLE, DISPLAY CONTROL METHOD, AND RECORDING MEDIUM RECORDED WITH DISPLAY CONTROL PROGRAM

CROSS-REFERENCE TO RELATED APPLICATION

This application is based on and claims priority under 35 USC 119 from Japanese Patent Application No. 2021-079539 filed on May 10, 2021, the disclosure of which is incorporated by reference herein.

BACKGROUND

Technical Field

The present disclosure relates to a display control device, a display device, a vehicle, a display control method, and a display control program.

Related Art

Japanese Patent Application Laid-Open (JP-A) No. H03-148800 discloses technology in which an image of the environment is generated by an imaging unit, and an instruction sign (such as an arrow indicating the direction to be taken) is formed based on navigation data generated by a navigation system. The instruction sign is then superimposed on the image of the environment by a video merging module or the like and displayed on a display unit.

However, in cases in which the road to be taken is indicated as in JP-A No. H03-148800, or a head-up display (HUD) device is employed in order for example to emphasize objects present ahead in the direction of progress, a virtual image (image) projected onto a screen (the windshield in the case of a vehicle) needs to be overlaid on an actual image ahead of the screen without appearing misaligned from the viewpoint of a user.

SUMMARY

Ant aspect of the present disclosure is a display control device comprising: a processor; and a memory that is coupled with the processor and is configured to store a correspondence relationship between an angle of a mirror configured to reflect light for display on a display and depth information indicating a virtual display position of an image for display on the display so as to correspond to an external scene, the processor being configured to: receive input from a user, and change the mirror angle in response to the received input, adjust a display position of an image to be displayed on the display based on the depth information associated with the mirror angle after it is changed, and display the image on the display.

BRIEF DESCRIPTION OF DRAWINGS

FIG. 4 is a flowchart illustrating an example of processing by a display control ECU;

FIG. 5C is an explanatory diagram illustrating an example of a display frame of an AR-HUD in a case in which the eye height of a user is medium height;

FIG. 5D is an explanatory diagram illustrating an example of a relationship between user eye height and an eye box in a case in which the eye height of a user is medium height;

FIG. 9 is an explanatory diagram illustrating a case in which a position of a display frame and a display image perspective have both been adjusted using a correspondence table expressing correspondence between a step count, a mirror angle, EP height, an angle of depression, and depth information in a second exemplary embodiment.

DETAILED DESCRIPTION

Detailed explanation follows regarding examples of exemplary embodiments of the present disclosure, with reference to the drawings.

First Exemplary Embodiment

Figure 1:
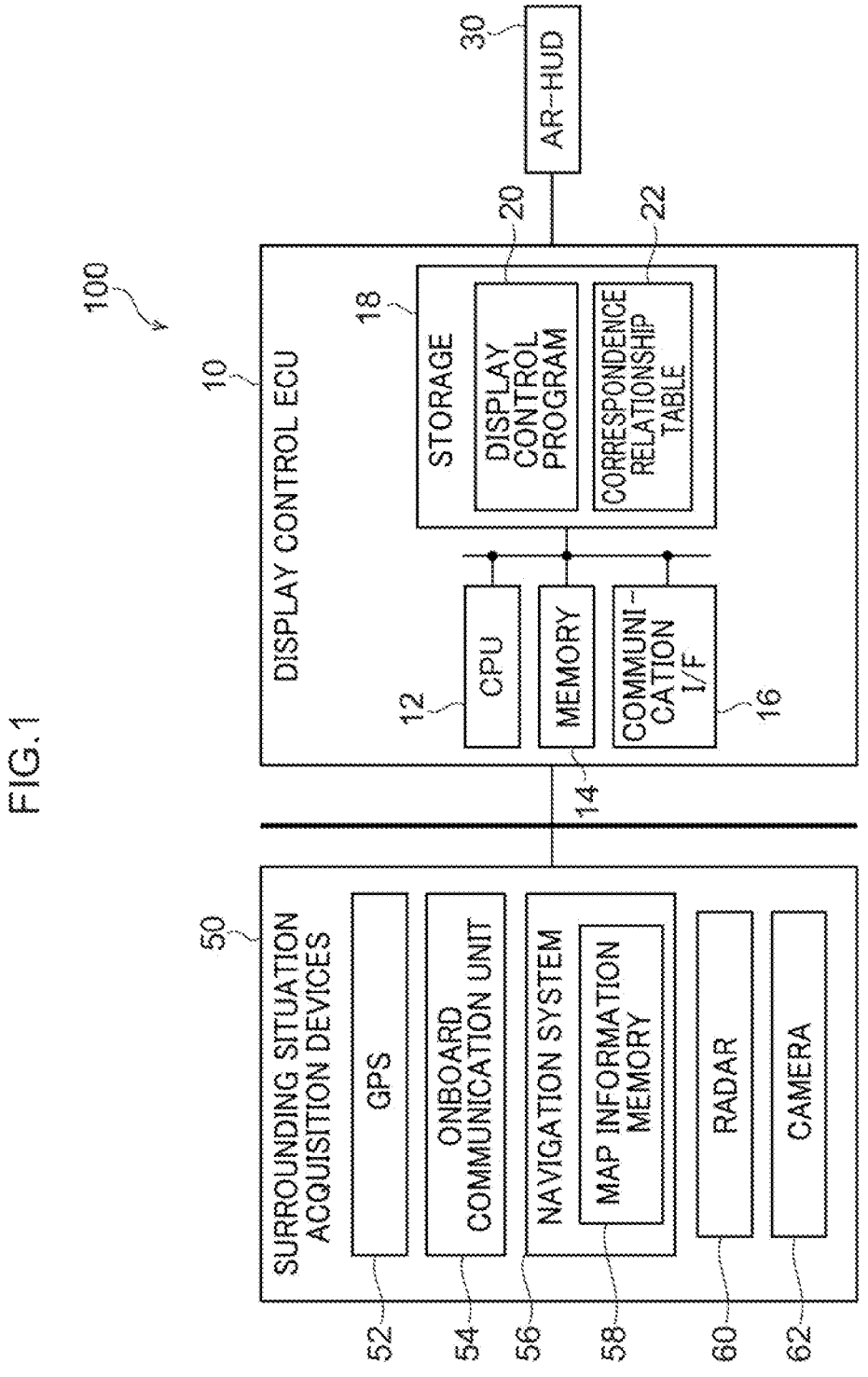
FIG. 1 is a block diagram illustrating an example of a configuration of a display control device according to a first exemplary embodiment.

FIG. 1 is a block diagram illustrating an example of a configuration of a display control device 100 according to a first exemplary embodiment. The display control device 100 is a device that is installed in a vehicle in order to control display on an AR-HUD 30, this being a display unit. The display control device 100 includes a display control electronic control unit (ECU) 10, a surrounding situation acquisition device array 50 that acquires information regarding the situation in the vehicle surroundings, and the AR-HUD 30.

The display control ECU 10 includes a central processing unit (CPU) 12 serving as an example of a hardware processor, memory 14, a communication interface (I/F) 16, and storage 18 serving as an example of memory. The CPU 12, the memory 14, the communication I/F 16, and the storage 18 are connected to one another through various buses, such as an address bus, a data bus, and a control bus. The surrounding situation acquisition device array 50 and an AR-HUD operating panel operated by a user are connected to the communication I/F 16.

The storage 18 is a device that holds information, programs, and so on, and is configured by non-volatile storage such as a hard disk drive (HDD) or flash memory. As illustrated in FIG. 1, as an example, a display control program 20 for controlling display on the AR-HUD 30, and a correspondence relationship table 22 that specifies a virtual display position for a virtual image on the AR-HUD 30 with respect to an external scene in response to the gaze of the user, are held in the storage 18. In the present exemplary embodiment, the display control program 20 is expanded in the memory 14, and this program is then loaded and executed in the CPU 12. The CPU 12 thereby functions as a display controller 24 as illustrated in FIG. 2.

The surrounding situation acquisition device array 50 includes a global positioning system (GPS) 52 that measures the position of the ego vehicle based on information from satellites, and an onboard communication unit 54 that is capable of what is referred to as V2X communication with communication equipment outside the vehicle. The surrounding situation acquisition device array 50 also includes a navigation system 56 that guides the vehicle to its destination based on the measurement result of the GPS 52 and map information held in map information memory 58, a radar 60 that detects obstacles and so on in the vehicle surroundings from radio waves (millimeter waves) emitted toward and reflected by the vehicle surroundings, and a camera 62 that acquires image information regarding the vehicle surroundings.

Figure 2:
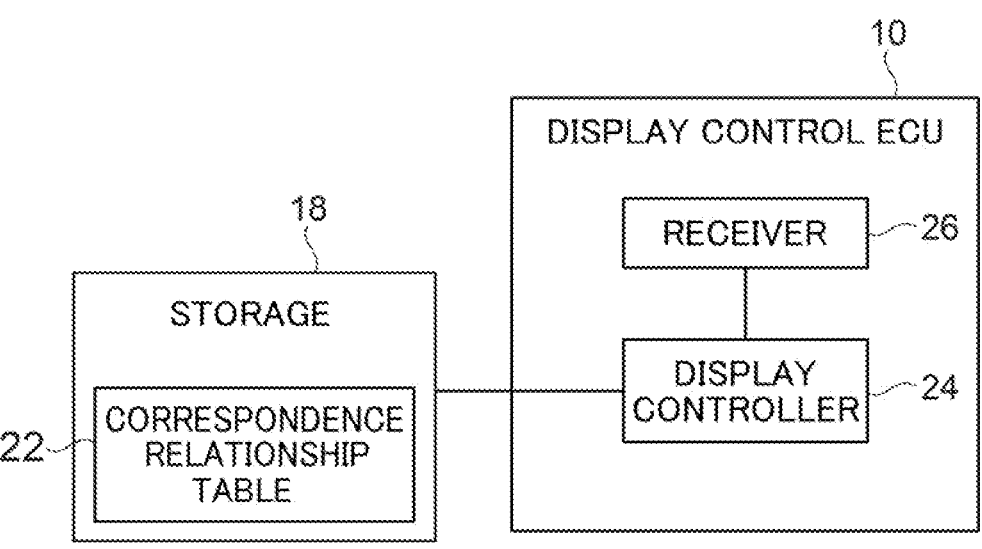
FIG. 2 is a functional block diagram illustrating a CPU of a display control ECU.

FIG. 2 is a functional block diagram illustrating the CPU 12 of the display control ECU 10. Explanation follows regarding functionality implemented when the CPU 12 executes the display control program. The display control program includes a reception function to receive an instruction from the user regarding an image display position, and a display control function to control the display on the AR-HUD 30 in response to the instruction from the user by referencing the correspondence relationship table 22 in the storage 18. As illustrated in FIG. 2, the CPU 12 functions as the display controller 24 and a receiver 26 by the CPU 12 loading and executing the display control program including these functions.

Figure 3:
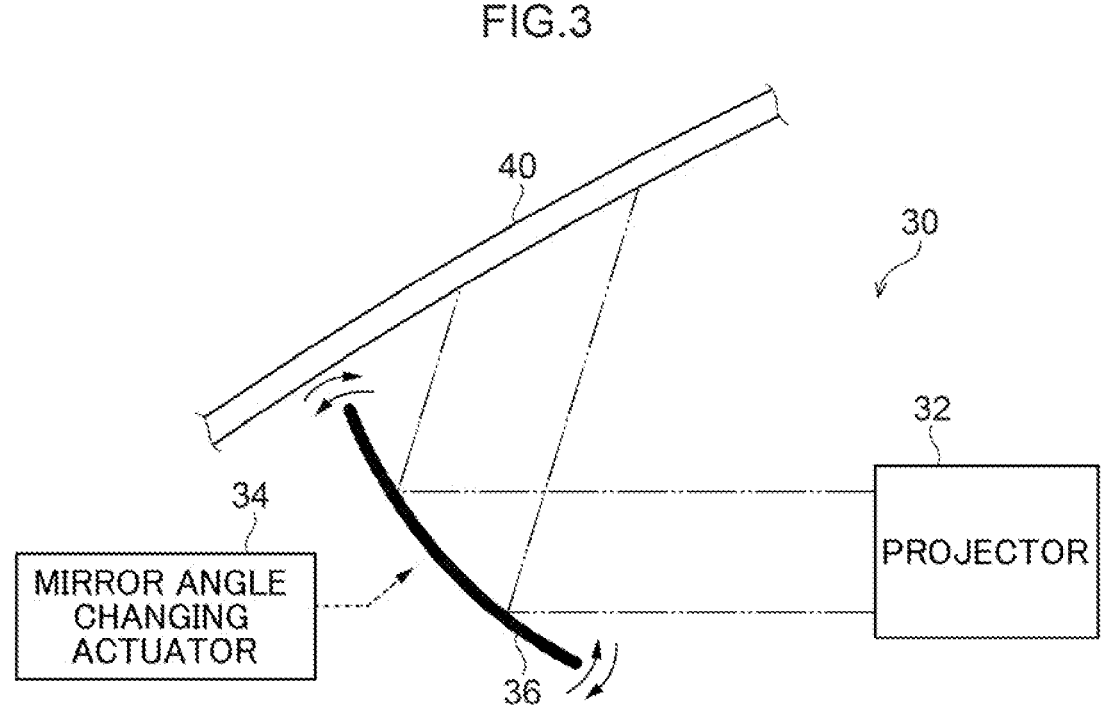
FIG. 3 is a block diagram illustrating an example of a configuration of an AR-HUD.

FIG. 3 is a block diagram illustrating an example of a configuration of the AR-HUD 30. The AR-HUD 30 includes a projector 32 that projects a generated display image onto a windshield 40 of the vehicle via a mirror 36 configured by a concave mirror, and a mirror angle changing actuator 34 that changes a projection position of the display image by changing an angle of the mirror 36. Processing is performed such that a projected image such as a one-way mirror can be displayed on a cabin interior surface of the windshield 40, and such that the scene outside the vehicle is also visible to the user through the windshield 40. The mirror angle changing actuator 34 is configured by a device that is capable of precise positioning control, such as a stepper motor.

FIG. 4 is a flowchart illustrating an example of processing by the display control ECU 10. The processing illustrated in FIG. 4 is for example initiated when a door on a driving seat side of the vehicle is opened.

At step 400, determination is made as to whether or not user boarding has been detected. As an example, determination as to whether or not a user is boarding is made based on detection by a seating sensor provided to the seat surface of the driving seat. The seating sensor is for example a sensor that uses a piezoelectric element or the like to detect a change in pressure when a user sits down. Processing transitions to step 402 in cases in which user boarding has been detected at step 400, whereas the processing stands by until user boarding is detected in cases in which user boarding has not been detected.

At step 402, key information employed when the user boarded the vehicle is acquired. In the present exemplary embodiment, the user locks and unlocks the vehicle doors, starts the engine, and so on using various identifiable keys. Key information regarding the key employed by the user when the user unlocks the vehicle doors, or received key information that is information continuously emitted by the key in the possession of the user, may be acquired at step 402.

At step 404, determination is made as to whether or not an ignition switch of the vehicle has been switched on. Processing transitions to step 406 in cases in which the ignition switch has been switched on. The processing stands by until the ignition switch is switched on in cases in which the vehicle ignition switch has not been switched on at step 404.

At step 406, determination is made as to whether or not the acquired key information is information that has already been registered in the vehicle storage 18 or the like. At step 406, processing transitions to step 410 in cases in which the acquired key information is registered information, whereas processing transitions to step 408 in cases in which the acquired key information is not registered information.

Figure 5A:
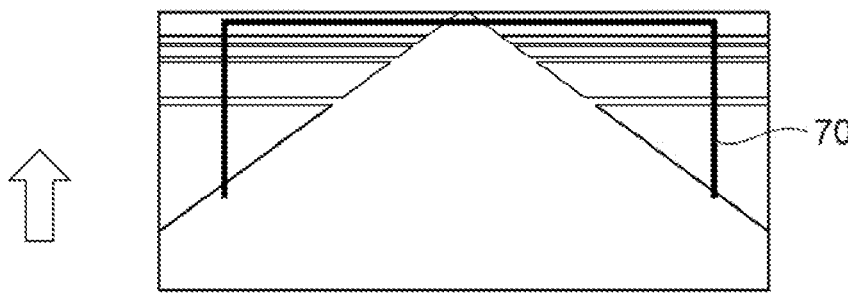
FIG. 5A is an explanatory diagram illustrating an example of a display frame of an AR-HUD in a case in which the eye height of a user is high.

At step 408, the height of the AR-HUD 30 is adjusted. The present exemplary embodiment introduces a concept referred to as an eye box (EB), this being a range in which a picture is visible even if an eye position EP varies. In FIG. 5A to FIG. 5F, the height of the eye box EB is 40 mm, and a range corresponding to the eye box EB is displayed as a display frame 70 in FIG. 5A, FIG. 5C, and FIG. 5E. The display frame 70 can be adjusted upward and downward as illustrated in FIG. 5A, FIG. 5C, and FIG. 5E by changing the angle of the mirror 36.

Figure 5B:
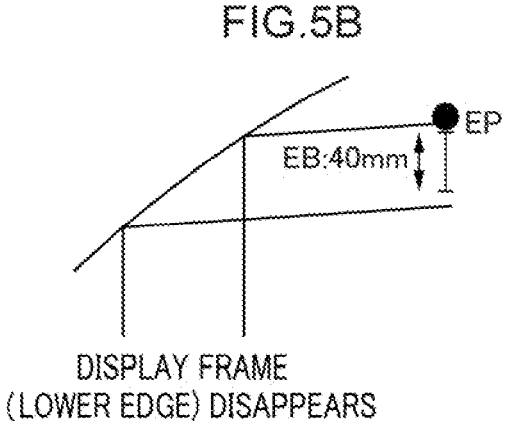
FIG. 5B is an explanatory diagram illustrating an example of a relationship between user eye height and an eye box in a case in which the eye height of a user is high.
Figures 5C, 5D:
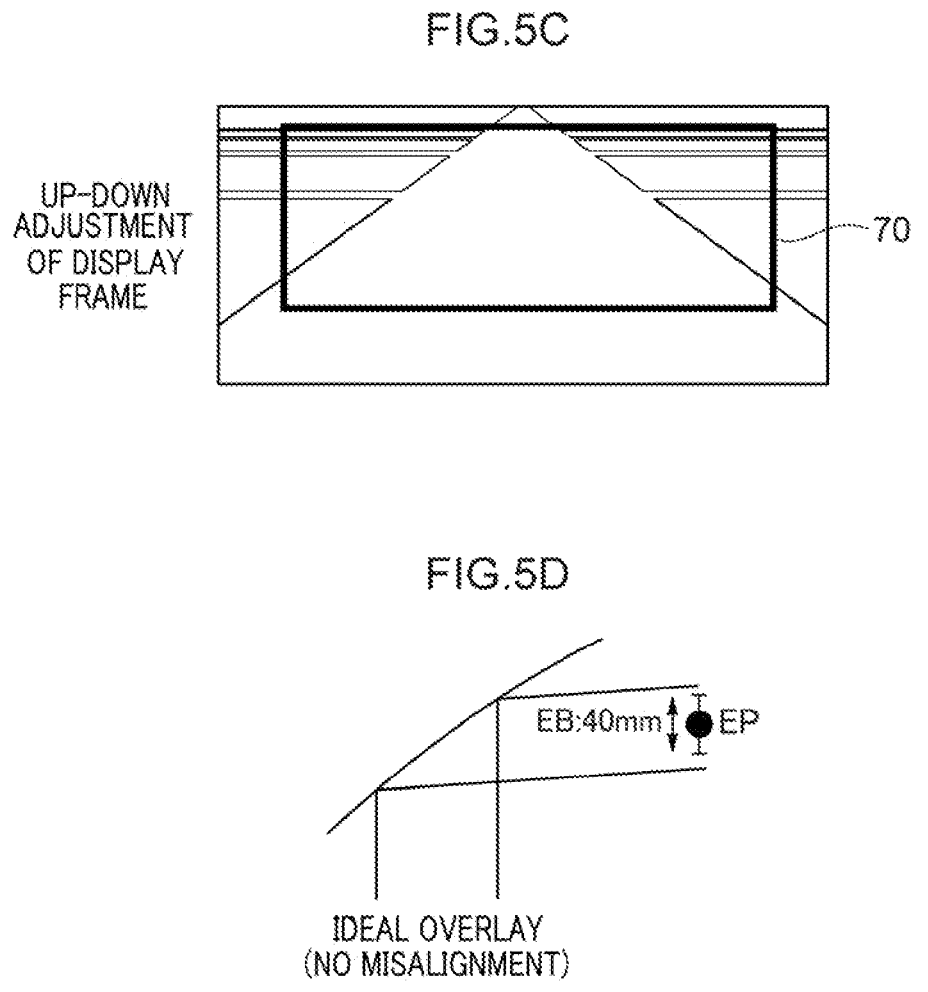
Figure 5E:
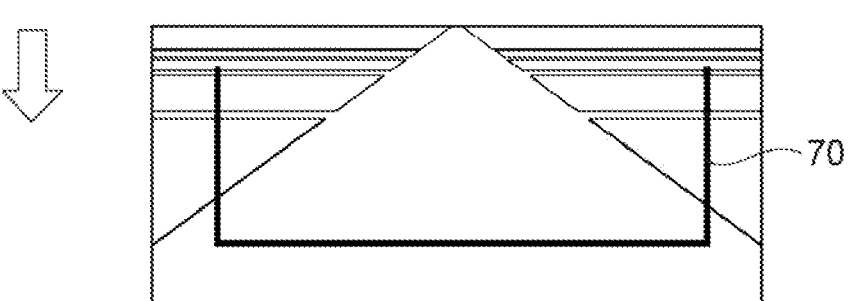
FIG. 5E is an explanatory diagram illustrating an example of a display frame of an AR-HUD in a case in which the eye height of a user is low.
Figure 5F:
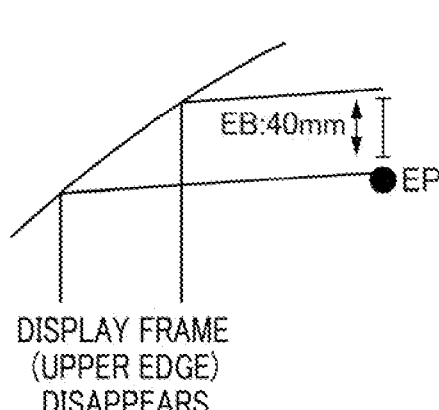
FIG. 5F is an explanatory diagram illustrating an example of a relationship between user eye height and an eye box in a case in which the eye height of a user is low.

FIG. 5B, FIG. 5D, and FIG. 5F illustrate changes in the eye position with respect to the eye box EB. FIG. 5B illustrates a state in which the eye position EP is at an upper limit of the eye box EB. As illustrated in FIG. 5A, even if the display position is adjusted upward by adjusting the angle of the mirror 36, a lower end portion of the display frame 70 visible to the user cannot be seen as a result.

FIG. 5D illustrates a state in which the eye position EP is within the range of the eye box EB. As illustrated in FIG. 5C, the entire region of the display frame 70 is visible to the user as a result.

FIG. 5F illustrates a state in which the eye position EP is at a lower limit of the eye box EB. As illustrated in FIG. 5E, even if the display position is adjusted downward by adjusting the angle of the mirror 36, an upper end portion of the display frame 70 visible to the user cannot be seen as a result.

Figure 6A:
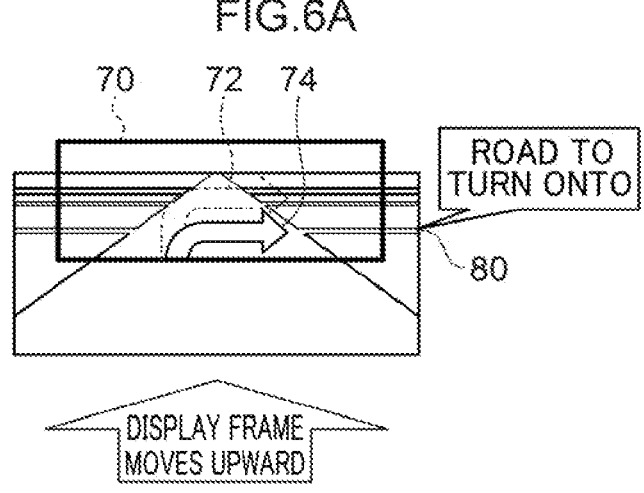
FIG. 6A is an explanatory diagram illustrating an example of a display on an AR-HUD in a case in which the eye height of a user is low.
Figure 6B:
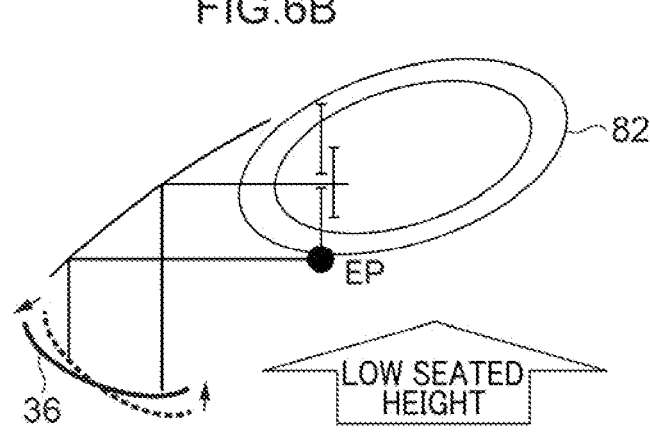
FIG. 6B is an explanatory diagram illustrating an example of a relationship between a mirror angle and the eye height of a user in a case in which the eye height of the user is low.

FIG. 6A is an explanatory diagram of a display on the AR-HUD 30 in a case in which the user has a low seated height, and their eye position EP is a low position as illustrated in FIG. 6B.

Figure 6C:
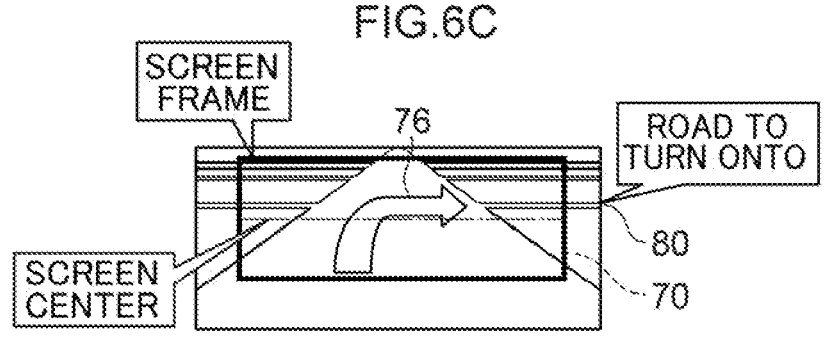
FIG. 6C is an explanatory diagram illustrating an example of a display on an AR-HUD in a case in which the eye height of a user is medium height.
Figure 6D:
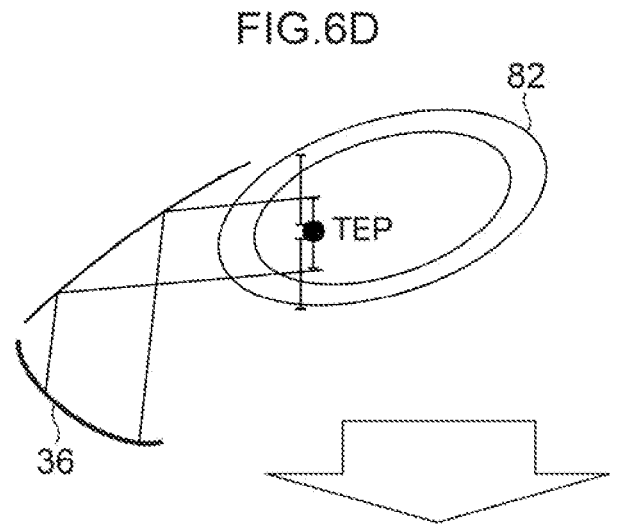
FIG. 6D is an explanatory diagram illustrating an example of a relationship between a mirror angle and the eye height of a user in a case in which the eye height of the user is medium height.

FIG. 6C is an explanatory diagram of a display on the AR-HUD 30 in a case in which the user has a medium seated height, and their eye position EP is a middle position as illustrated in FIG. 6D. As described previously, in cases in which the eye position EP of the user is at medium height, the entire region of the display frame 70 is visible.

Figures 6E, 6F:
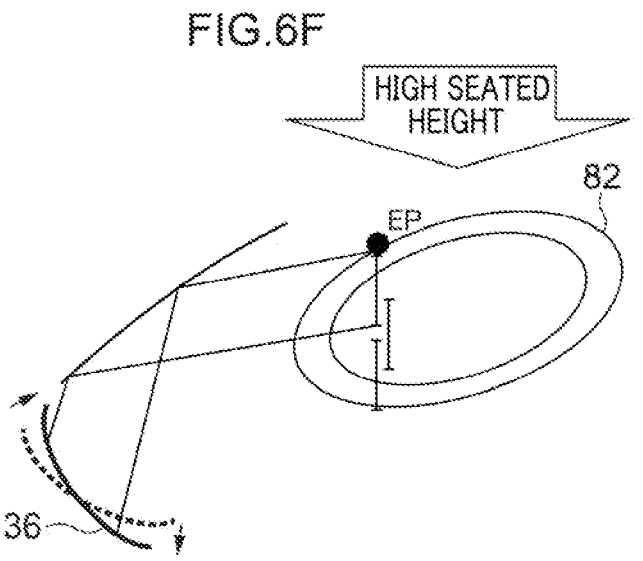
FIG. 6E is an explanatory diagram illustrating an example of a display on an AR-HUD in a case in which the eye height of a user is high.
FIG. 6F is an explanatory diagram illustrating an example of a relationship between a mirror angle and the eye height of a user in a case in which the eye height of the user is high.

FIG. 6E is an explanatory diagram of a display on the AR-HUD 30 in a case in which the user has a high seated height, and their eye position EP is a high position as illustrated in FIG. 6F.

The elliptical region illustrated in FIG. 6B, FIG. 6D, and FIG. 6F respectively is an eyellipse 82 representing distribution of eye positions of users with different builds. Although the eye position EP is generally present on the eyellipse 82, the eye position EP may be offset from the eyellipse 82 as illustrated in FIG. 6D, depending on the build of the user.

When the perspective (sense of distance) of a display image 76, this being an arrow-shaped virtual image indicating the direction the vehicle should take, is adjusted envisaging a case in which the eye position EP of the user is at the middle height as illustrated in FIG. 6D, the display image 76 can be made to match a route 80 (the road to turn onto), this being an actual image, as illustrated in FIG. 6C.

However, when the eye position EP of the user is low as illustrated in FIG. 6B, the position of the display frame 70 moves upward, and if a display image 72 were displayed so as to have a similar perspective to the display image 76, this display image 72 would not match the route 80 that is the actual image.

Moreover, when the eye position EP of the user is high as illustrated in FIG. 6F, the position of the display frame 70 moves downward, and if a display image 72 were displayed so as to have a similar perspective to the display image 76, this display image 72 would not match the route 80 that is the actual image.

In order to suppress the phenomenon in which the display image 72 and the route 80 do not match as illustrated in FIG. 6A and FIG. 6E, the perspective of the display image 72 needs to be adjusted in response to the eye position EP of the user.

Namely, in the case illustrated in FIG. 6A, the display image 72 is compressed in a depth direction to generate a display image 74, and the displayed display image 74 is thereby made to match the route 80. In the case illustrated in FIG. 6E, the display image 72 is enlarged in the depth direction to generate a display image 78, and the displayed display image 78 is thereby made to match the route 80. Note that although the display frame 70 is illustrated in FIG. 6A, FIG. 6C, and FIG. 6E, the display frame 70 serves as a guide for the display range of the display image 76 and so on, and so does not have to be displayed in the mass produced product.

Figure 7:
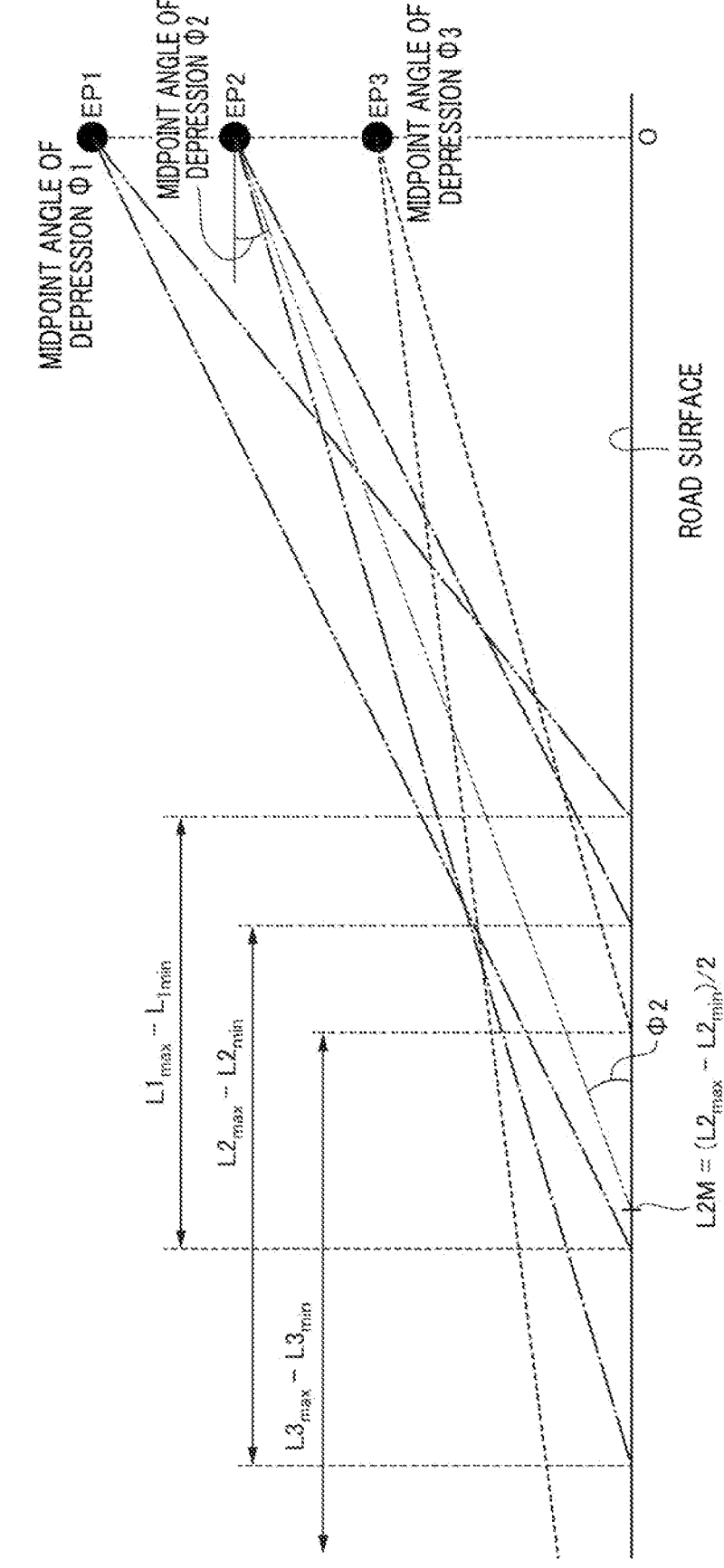
FIG. 7 is an explanatory diagram illustrating a relationship between the height of an eye position of a user, depth information indicating a position where the gaze of the user intersects the road surface, and a midpoint angle of depression of the gaze of the user.
Figure 8:
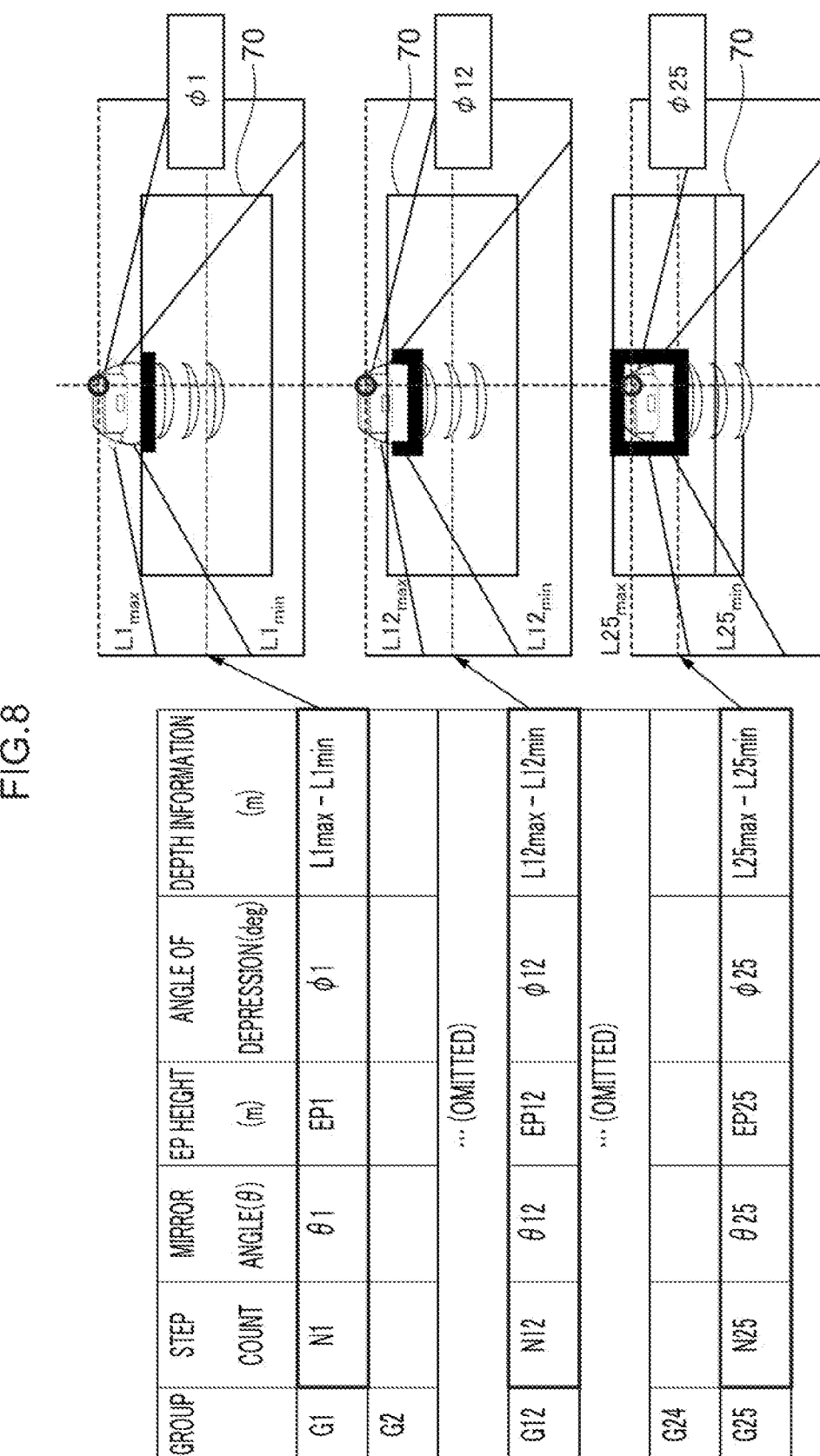
FIG. 8 is an explanatory diagram illustrating a case in which a position of a display frame and a display image perspective have both been adjusted using a correspondence table expressing correspondence between a mirror angle, EP height, an angle of depression, and depth information.

FIG. 7 is an explanatory diagram illustrating a relationship between eye position heights EP1, EP2, and EP3 of users, depth information L1max–L1min, L2max–L2min, and L3max–L3min indicating positions where the gazes of the respective users intersect the road surface, and midpoint angles of depression φ1, φ2, and φ3 of the gazes of the respective users. As illustrated in FIG. 8, in the present exemplary embodiment, the position of the display frame 70 and the perspective of the display image are both adjusted using a correspondence table expressing correspondence between a mirror angle that is the angle of the mirror 36, the EP height that is the height of the eye position of the user, the angle of depression, and the depth information.

Respective relationships between the EP height, the angle of depression, and the depth information may for example be computed in the following manner. FIG. 7 assumes that the depth information L1max–L2max–L2min, L3max–L3min, and so on are predetermined. L1max, L1min, L2max, L2min, L3max, and L3min each indicate a distance from an intersection point O where the foot of a perpendicular line of height EP height intersects the road surface, and also indicate a virtual position at an upper edge or a lower edge of a virtual image of the display frame 70 on the external scene. The display control ECU 10 performs image processing using software including an algorithm to adjust the perspective of the display image according to the respective depth information L1max–L1min, L2max–L2min, and L3max–L3min.

As a representative example, consider a case in FIG. 7 in which the EP height is EP2. In the case of EP2, the depth information is L2max–L2min, and so a midpoint L2M of this depth information is at a distance L2M from the intersection point O, as expressed by Equation (1) below.

$$L2M=(L2\text{max}-L2\text{min})/2+L2\text{min} \tag{1}$$

Moreover, a tangent of the midpoint angle of depression φ2 is given by Equation (2) below.

$$\tan \varphi2=EP2/L2M \tag{2}$$

Thus, the midpoint angle of depression φ2 can be found using Equation (3) below.

$$\varphi2=\tan^{-1}(EP2/L2M) \tag{3}$$

Midpoint angles of depression are computed in a similar manner using various EP heights and depth information. The corresponding mirror angle can also be computed once the midpoint angle of depression has been computed.

FIG. 8 illustrates an example of a correspondence table expressing correspondence between a step count indicating the number of operations to be performed by the mirror angle changing actuator 34 of the present exemplary embodiment, the mirror angle, the EP height, the angle of depression, and the depth information. The step count in FIG. 8 indicates the number of operations to be performed by the stepper motor or the like configuring the minor angle changing actuator 34 until the angle of the mirror 36 reaches a predetermined mirror angle. For example, when an angle change amount in a single operation by the stepper motor configuring the minor angle changing actuator 34 is Δθ, a relationship between a minor angle θ1 and a step count N1 is given in Equation (4) below. Step counts N12, N25, and so on are computed in a similar manner.

$$N1=\theta1/\Delta\theta \tag{4}$$

In the present exemplary embodiment, the display position of the display frame 70 and the perspective of the display image are both adjusted based on the correspondence table illustrated in FIG. 8. Specifically, when the user performs an operation to adjust the position of the display frame 70, change the EP height, adjust the angle of depression, or the like at step 408 in FIG. 4, a signal relating to this operation is input to the receiver 26 of the CPU 12. As an example, when the user is to perform such an operation, the display frame 70 and a display image for adjustment purposes are displayed on the AR-HUD 30, and the user adjusts the display frame 70 and the display image for adjustment purposes so as to be easier for them to see. The receiver 26 is capable of receiving additional input from the user, and the display controller 24 further changes the angle of the mirror 36 in response to the additional input received by the receiver 26.

When the signal relating to the user operation is input to the receiver 26, the display controller 24 of the CPU 12 references the correspondence table such as that illustrated in FIG. 8 held in the storage 18, and adjusts the minor angle and adjusts the perspective of the display image accordingly. Respective information relating to these adjustments is then associated with key information for the user and stored in the storage 18.

At step 406, in cases in which the acquired key information has already been registered, processing transitions to step 410. At step 410, the information associated with the key information is acquired from the storage 18, and the display on the AR-HUD 30 is adjusted according to the acquired information.

At step 412, content display processing is performed such that a display image is displayed according to the adjustment of the display on the AR-HUD 30 performed at step 408 or 410. At step 414, determination is made as to whether or not the vehicle ignition switch has been switched off. The processing is ended in cases in which the ignition switch has been switched off, whereas the content display processing of step 412 is continued in cases in which the ignition switch has not been switched off.

As described above, in the present exemplary embodiment, the correspondence table, in which the step count indicating the number of operations to be performed by the mirror angle changing actuator 34, the mirror angle, the EP height, the angle of depression, and the depth information are predetermined, is referenced. Adjustment of the display image perspective and adjustment of the position of the display frame 70 that is the display image display range are then performed in response to the depth information indicating the distance to positions where the gaze of the user intersects the road surface. Such adjustments enable the position of the display image that is a virtual image and the position of a target object in the external scene that is an actual image to be made to match when viewed by the user.

In contrast to the present exemplary embodiment, if the adjustment of the display image perspective and the adjustment of the position of the display frame 70 that is the display image display range were not performed, although the eye box EB may feasibly be enlarged, a larger concave mirror would be required for the larger eye box, and so the size of the AR-HUD casing would become larger, such that vehicle installation would be more difficult. Moreover, the range over which the user would need to move their eyes in order to check for information would become larger, which could fatigue the user and make the information less visible, thereby affecting safety.

In the present exemplary embodiment, by adjusting the display range perspective and adjusting the display image display range as described above, the position of the display image that is a virtual image and the position of a target object in the external scene that is an actual image can be made to match as seen by the user, thereby enabling visibility of the information and safety to be ensured while suppressing user fatigue.

Second Exemplary Embodiment

Next, explanation follows regarding a second exemplary embodiment of the present disclosure. The present exemplary embodiment only differs to the first exemplary embodiment described above in the respect that adjustment of the display image perspective and adjustment of the mirror angle are performed based on a different correspondence table to that in FIG. 8. Other configuration is the same as that in the first exemplary embodiment. Thus, in the present exemplary embodiment, the same configuration as that in the first exemplary embodiment is allocated the same reference numerals, and detailed explanation thereof is omitted.

FIG. 9 illustrates an example of a correspondence table expressing correspondence between the step count that is the number of operations to be performed by the mirror angle changing actuator 34 of the present exemplary embodiment, the mirror angle, the EP height, the angle of depression, and the depth information. In the present exemplary embodiment, the respective mirror angles, EP heights, and angles of depression corresponding to step counts N1 to N8 are categorized into group G1, the respective mirror angles, EP heights, and angles of depression corresponding to step counts N9 to N16 are categorized into group G2, and the respective mirror angles, EP heights, and angles of depression corresponding to steps N17 to N24 are categorized into group G3, and the depth information within each of these groups is given the same value.

In the correspondence table illustrated in FIG. 8, if the step count, the mirror angle, the EP height, and the angle of depression are altered, different depth information is associated therewith. Thus, the perspective of the display image is adjusted whenever the step count, the minor angle, the EP height, and the angle of depression change.

However, adjusting the perspective of the display image is a considerable computation load on the CPU 12. Thus, in the present exemplary embodiment, the same perspective adjustment is performed on the display image when the changes to the step count, the mirror angle, the EP height, and the angle of depression are within a predetermined range. Fine adjustment of the position of the display image that is the virtual image with respect to the position of the target object in the external scene that is the actual image can then be handled by adjusting the mirror angle.

As described above, in the present exemplary embodiment, in cases in which changes to the step count, the mirror angle, the EP height, and the angle of depression are within a predetermined range, the same perspective adjustment is performed on the display image, thereby enabling the computation load on the CPU 12 to be suppressed.

Note that the processing executed by the CPU reading and executing software (a program) in the above exemplary embodiments may be executed by various types of processors other than a CPU, such as a graphic processing unit (GPU). Alternatively, the processor may be a programmable logic device (PLD) that allows circuit configuration to be modified post-manufacture, such as a field-programmable gate array (FPGA), or a dedicated electric circuit, this being a processor including a circuit configuration custom-designed to execute specific processing, such as an application specific integrated circuit (ASIC). The processing may be executed by any one of these various types of processors, or by a combination of two or more of the same type or different types of processors (such as plural FPGAs, or a combination of a CPU and an FPGA). The hardware structure of these various types of processors is more specifically an electric circuit combining circuit elements such as semiconductor elements.

In the above exemplary embodiments, the program is in a format pre-stored (installed) in a disc drive or the like;

however, there is no limitation thereto. The program may be provided in a format stored on a non-transitory storage medium such as compact disc read only memory (CD-ROM), digital versatile disc read only memory (DVD-ROM), or universal serial bus (USB) memory. Alternatively, the program may be provided in a format downloadable from an external device over a network.

An object of the present disclosure is to obtain a display control device, a display device, a vehicle, a display control method, and a recording medium recorded with a display control program that are capable of displaying an image so as to be overlaid on an actual image without appearing misaligned from the viewpoint of a user.

A first aspect of the present disclosure is a display control device comprising: a processor; and a memory that is coupled with the processor and is configured to store a correspondence relationship between an angle of a mirror configured to reflect light for display on a display and depth information indicating a virtual display position of an image for display on the display so as to correspond to an external scene, the processor being configured to: receive input from a user, and change the mirror angle in response to the received input, adjust a display position of an image to be displayed on the display based on the depth information associated with the mirror angle after it is changed, and display the image on the display.

In the first aspect, the correspondence relationship between the angle of the mirror that reflects light for display on the display unit such as an augmented reality (AR)-HUD, and the depth information indicating the display position of the image that can be displayed on the display unit along a depth information direction of the display unit, is stored in the memory. The mirror angle is changed in response to input from the user, and the image to be displayed on the display unit is then displayed at the required display position based on the depth information corresponding to the mirror angle after the angle change. This enables the image to be displayed on the display unit so as to be overlaid on the actual image without the image appearing misaligned from the viewpoint of the user.

A second aspect of the present disclosure is the display control device of the first aspect, wherein: the depth information is stored in the memory associated with each mirror angle; and the processor is configured to adjust the display position using the depth information associated with the minor angle after the angle change.

In the second aspect, the display position of the image is switched in coordination with a mirror angle change, thereby enabling the image to be displayed on the display unit so as to be overlaid on the actual image without the image appearing misaligned from the viewpoint of the user, even in cases in which input to change the mirror angle has been received.

A third aspect of the present disclosure is the display control device of the first aspect, wherein: the depth information is stored in the memory associated with each of a plurality of groups that encompass a plurality of angles of the mirror; and the processor is configured to adjust the display position using the depth information associated with a group to which the mirror angle after the angle change belongs.

In the third aspect, the display position of the image is switched in coordination with a mirror angle change between mirror angle groups, thereby enabling the image to be displayed on the display unit so as to be overlaid on the actual image without the image appearing misaligned from the viewpoint of the user, even in cases in which input to change the mirror angle has been received.

A fourth aspect of the present disclosure is the display control device of the third aspect, wherein the processor is configured to: receive additional input from the user; and further change the mirror angle in response to the additional input received.

In the fourth aspect, the image can be displayed on the display unit so as to be overlaid on the actual image without the image appearing misaligned from the viewpoint of the user, even in cases in which the image has become misaligned with respect to the actual image from the viewpoint of the user for some reason.

A fifth aspect of the present disclosure is the display control device of any of the first to the fourth aspects, wherein the depth information stored in the memory indicates virtual positions, in the external scene, of an upper edge and a lower edge of a rectangular range in which the image is displayed.

In the fifth aspect, a position along a height direction of the display unit that corresponds to a position in the depth information direction of the image can be found as a display position of the image to be displayed on the display unit.

In the sixth aspect, the display control device according to any of the first to the fifth aspects is included, thereby enabling the image to be displayed on the display unit so as to be overlaid on the actual image without the image appearing misaligned from the viewpoint of the user, similarly to in the first to the fifth aspects.

A seventh aspect of the present disclosure is a method of controlling a display, a correspondence relationship between an angle of a minor configured to reflect light for display on the display and depth information indicating a virtual display position of an image for display on the display so as to correspond to an external scene being stored in a memory, the method comprising, by a processor: receiving input from a user, and changing the mirror angle in response to the received input, adjusting a display position of an image to be displayed on the display based on the depth information corresponding to the mirror angle after it is changed, and displaying the image on the display.

In the seventh aspect, the image can be displayed on the display unit so as to be overlaid on the actual image without the image appearing misaligned from the viewpoint of the user, similarly to in the first aspect.

A eighth aspect of the present disclosure is a non-transitory recording medium storing a program executable by a computer to perform processing to control a display, a correspondence relationship between an angle of a minor configured to reflect light for display on the display and depth information indicating a virtual display position of an image for display on the display so as to correspond to an external scene being stored in a memory, the processing comprising: receiving input from a user, and changing the mirror angle in response to the received input, adjusting a display position of an image to be displayed on the display based on the depth information corresponding to the mirror angle after it is changed, and displaying the image on the display.

In the eighth aspect, the image can be displayed on the display unit so as to be overlaid on the actual image without the image appearing misaligned from the viewpoint of the user, similarly to in the first aspect.

The present disclosure enables an image to be displayed on the display unit so as to be overlaid on the actual image without the image appearing misaligned from the viewpoint of the user.

The invention claimed is:

1. A display control device comprising:

a memory that stores:

a correspondence table between mirror angles and depth information, wherein the table includes values of a plurality of predetermined depth information;

a set of groups corresponding to the plurality of predetermined depth information, each group comprising a predefined subset of mirror angles and being associated with only one value of depth information, and each group is assigned a unique group ID stored in the memory; and the plurality of predetermined depth information that each defines top and bottom edges of a display area of a display, wherein positions of the top and bottom edges are dynamically determined based on real-time object detection using an external environment sensor, and a mirror is configured to reflect light to generate a virtual image on the display area of the display, and each of the stored depth information indicates a virtual display position of the virtual image on the display area of the display that corresponds to a real external scene; and a processor coupled to the memory and programmed to:

receive input from a user;

change an angle of the mirror to one of the mirror angles in the table in response to the received input;

adjust the virtual display position of the virtual image to be displayed on the display area of the display based on the stored depth information associated with the changed angle of the mirror; and cause the display of the virtual image on the display area of the display, wherein the processor is programmed to adjust the display position using the depth information associated with a group of the groups to which the changed mirror angle belongs, and the processor is programmed to reference the group ID corresponding to the changed mirror angle to retrieve the associated value of the depth information.

2. The display control device of claim 1, wherein the processor is programmed to:

receive additional input from the user; and further change the mirror angle in response to the additional input received.

3. A vehicle comprising:

the display control device of claim 1; and the display.

4. A method of controlling a display, the method comprising:

storing, by a memory, a correspondence table between mirror angles and depth information, wherein the table includes values of a plurality of predetermined depth information;

storing, by the memory, a set of groups corresponding to the plurality of predetermined depth information, each group comprising a predefined subset of mirror angles and being associated with only one value of the depth information, and each group is assigned a unique group ID stored in the memory;

storing, by the memory, the plurality of predetermined depth information that each defines top and bottom edges of a display area of the display, wherein positions of the top and bottom edges are dynamically determined based on real-time object detection using an environmental sensor, and a mirror is configured to reflect light to generate a virtual image on the display area of the display, and each of the stored depth information indicates a virtual display position of the virtual image on the display area of the display that corresponds to a real external scene;

receiving input, by a processor, from a user;

changing, by the processor, an angle of the mirror to one of the stored angles in the table in response to the received input;

adjusting, by the processor, the virtual display position of the virtual image to be displayed on the display area of the display based on the stored depth information associated with the changed angle of the mirror; and causing, by the processor, a displaying of the virtual image on the display area of the display, wherein the method further comprises adjusting the display position using the depth information associated with a group of the groups to which the changed mirror angle belongs, and referencing the group ID corresponding to the changed mirror angle to retrieve the associated value of the depth information.

5. The method of claim 4, further comprising:

receiving additional input from the user; and further changing the mirror angle in response to the additional input received.

6. A non-transitory computer readable recording medium storing a program executable by a computer to perform processing to control a display, the processing comprising:

storing, by a memory, a correspondence table between mirror angles and depth information, wherein the table includes values of a plurality of predetermined depth information;

storing, by the memory, a set of groups corresponding to the plurality of predetermined depth information, each group comprising a predefined subset of mirror angles and being associated with only one value of the depth information, and each group is assigned a unique group ID stored in the memory;

storing, by the memory, the plurality of predetermined depth information that each defines top and bottom edges of a display area of the display, wherein positions of the top and bottom edges are dynamically determined based on real-time object detection using environmental sensor, and a mirror is configured to reflect light to generate a virtual image on the display area of the display, and each of the stored depth information indicating indicates a virtual display position of an-the virtual image for on the display area of the display that corresponds to a real external scene;

receiving, by a processor, input from a user;

changing, by the processor, an angle of the mirror to one of the stored angles in response to the received input;

adjusting, by the processor, the virtual display position of the virtual image to be displayed on the display area of the display based on the stored depth information associated with the changed angle of the mirror; and causing, by the processor, a displaying of the virtual image on the display area of the display, wherein the processing further comprises adjusting the display position using the depth information associated with a group of the groups to which the changed mirror angle belongs, and referencing the group ID corresponding to the changed mirror angle to retrieve the associated value of the depth information.

7. The non-transitory computer readable recording medium of claim 6, wherein the processing further comprises:
    receiving additional input from the user; and
    further changing the mirror angle in response to the additional input received.

* * * * *